Figure 1:
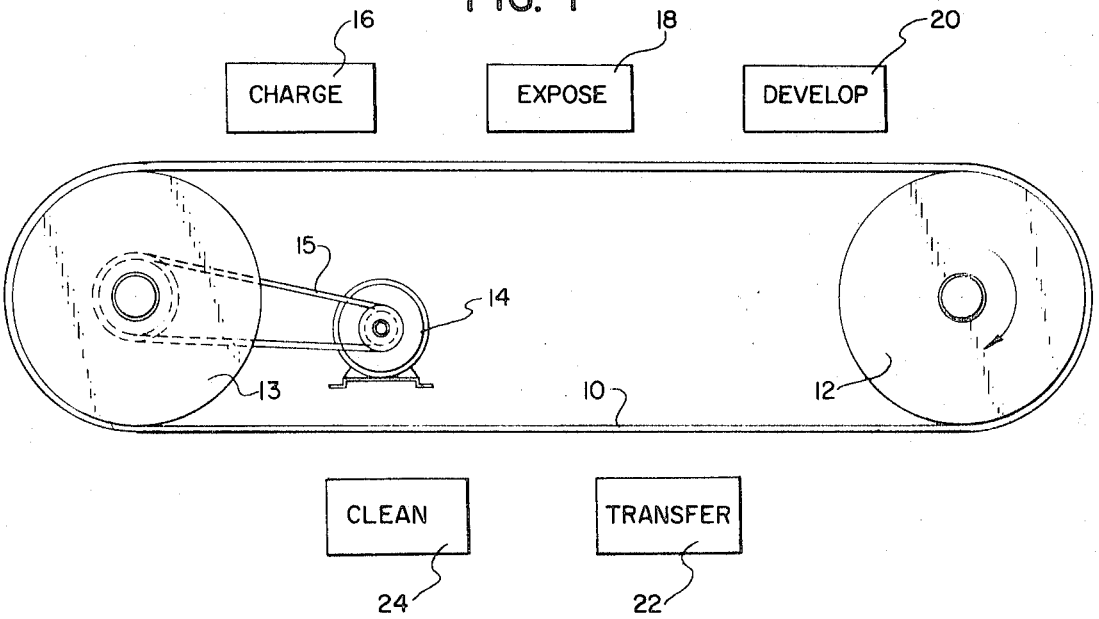
Figure 2:
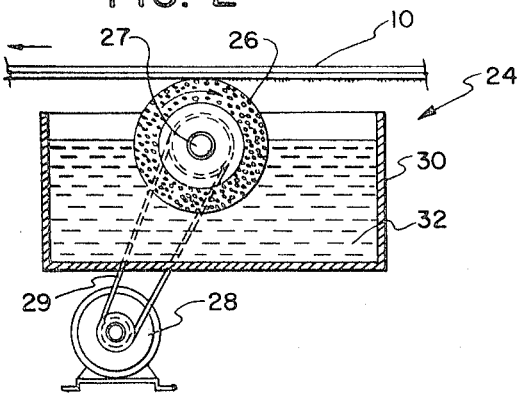
Figure 3:
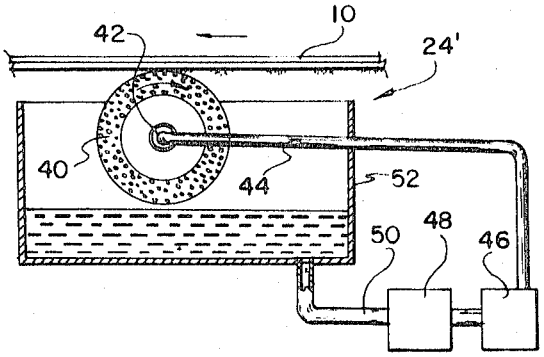
Figure 4:
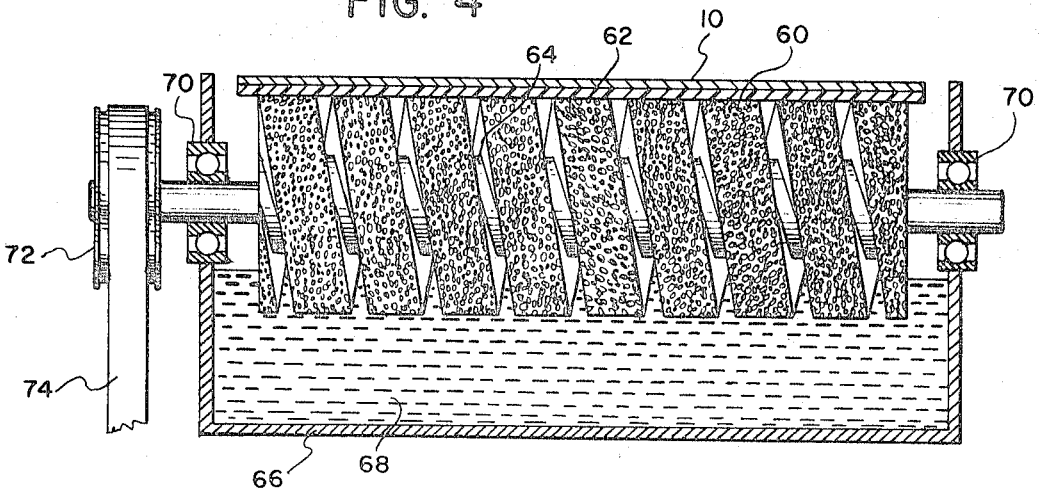
Figure 5:
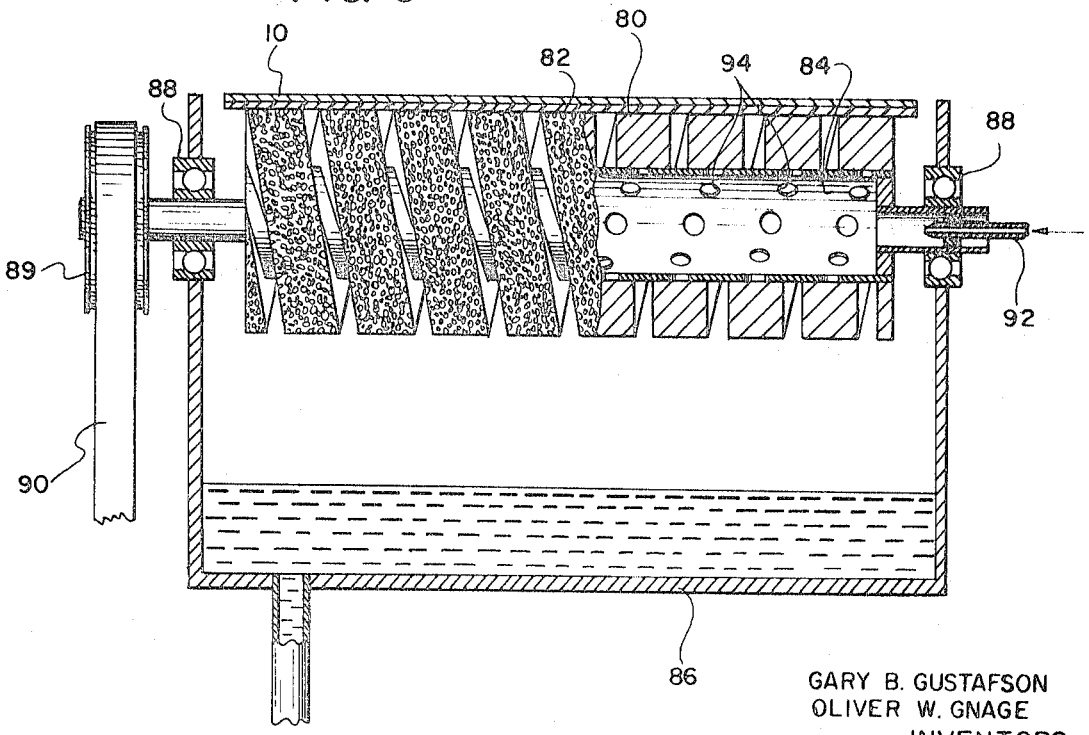
Figure 6:
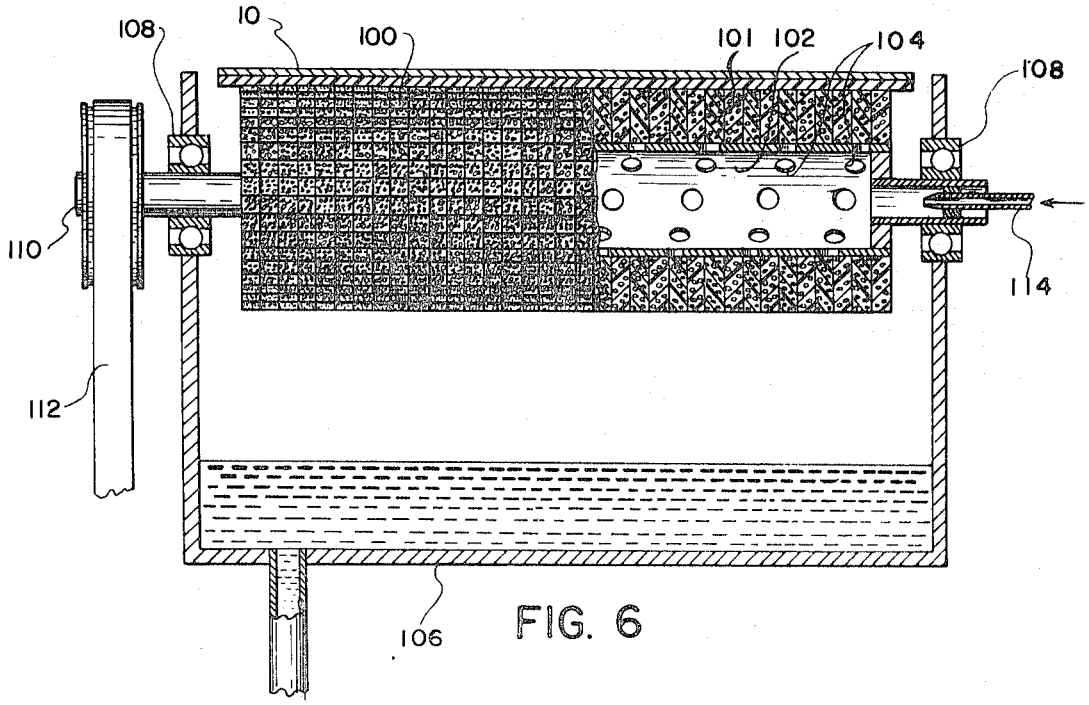
Figure 7:
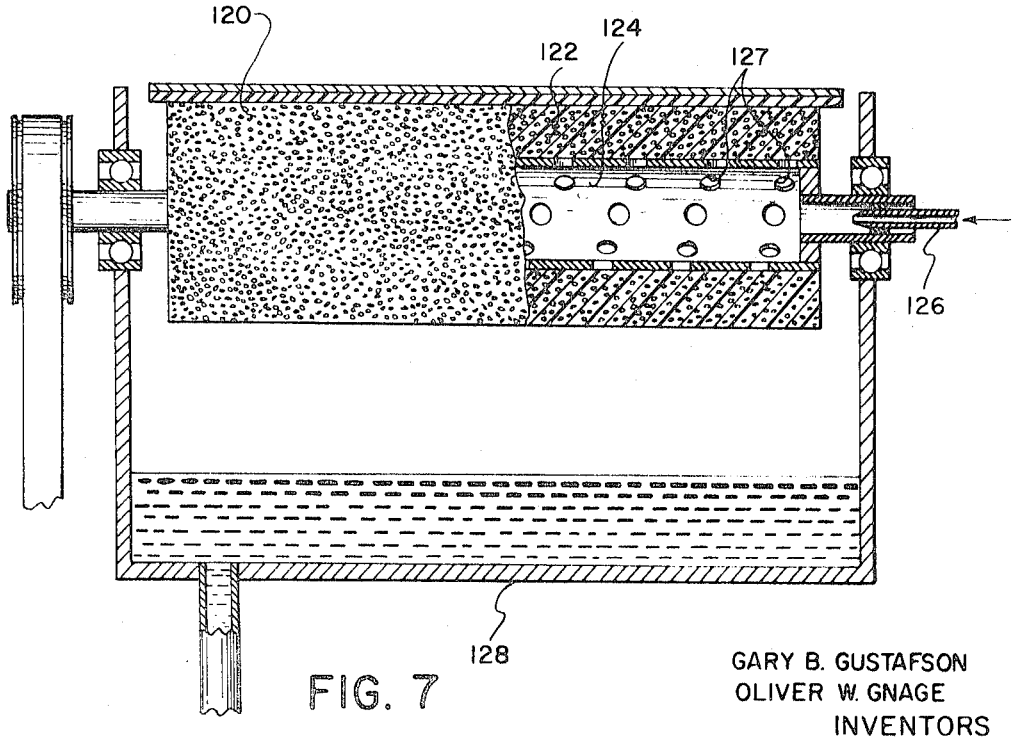
Figure 8:
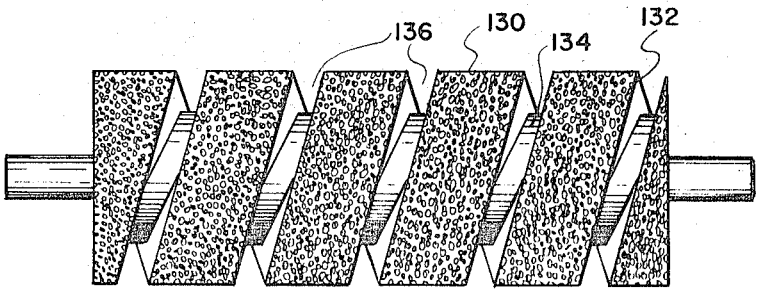
Figure 9:
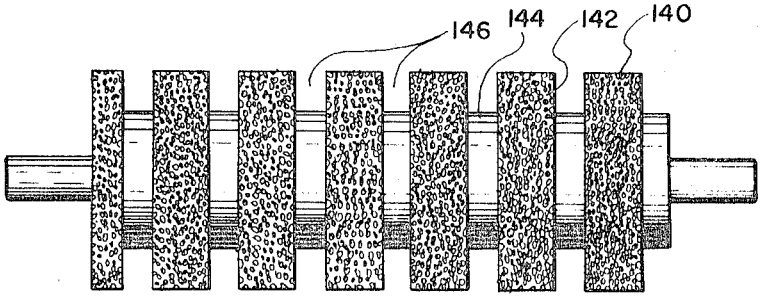
Figure 10:
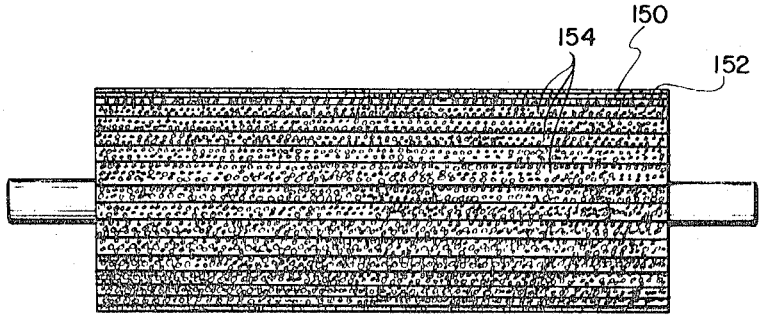
Figure 12:
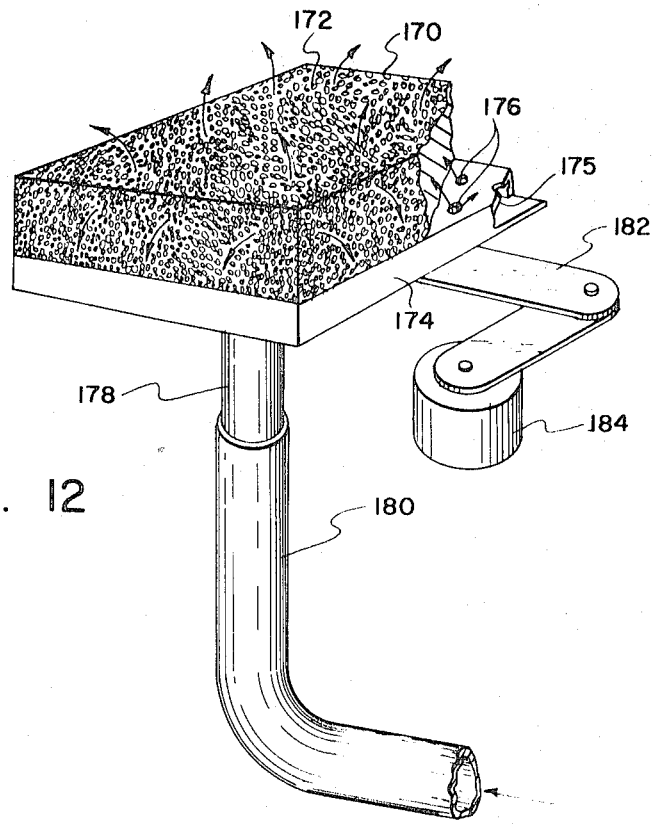
Figure 11:
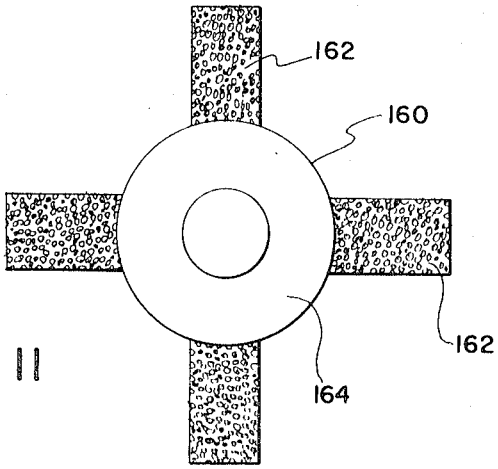

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1211

T892,011
METHOD AND APPARATUS FOR CLEANING PHOTOSENSITIVE ELEMENTS

Gary Boyd Gustafson and Oliver William Gnage, both of 901 Elmgrove Road, Rochester, N.Y. 14650

Filed Dec. 14, 1970, Ser. No. 97,758
Int. Cl. G03g *13/22, 15/22*
U.S. Cl. 134—9
5 Sheets Drawing. 10 Pages Specification

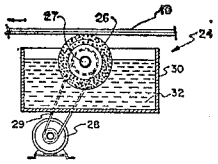

Apparatus for and a method of cleaning a photoconductive surface wherein an open cell or partial open cell sponge material, such as polyurethane, is utilized for cleaning the photoconductive surface. The sponge material is either moved through a cleaning fluid or a cleaning fluid is adapted to flow through the sponge material during the cleaning operation. In one embodiment, the sponge material is wound in a helix on a core. In another embodiment the sponge material is ribbed radially and in a further embodiment the sponge material is ribbed longitudinally. In a still further embodiment the sponge material is an oscillatory pad and in another embodiment is in the form of a paddle wheel.

METHOD AND APPARATUS FOR CLEANING PHOTOSENSITIVE ELEMENTS

Filed Dec. 14, 1970 5 Sheets-Sheet 1

GARY B. GUSTAFSON
OLIVER W. GNAGE
INVENTORS

BY Gary D. Fields
Robert W. Hampton
ATTORNEYS

METHOD AND APPARATUS FOR CLEANING PHOTOSENSITIVE ELEMENTS

Filed Dec. 14, 1970 5 Sheets-Sheet 2

GARY B. GUSTAFSON
OLIVER W. GNAGE
INVENTORS

BY Gary D. Fields
Robert W. Hampton
ATTORNEYS

METHOD AND APPARATUS FOR CLEANING PHOTOSENSITIVE ELEMENTS

Filed Dec. 14, 1970 5 Sheets-Sheet 3

GARY B. GUSTAFSON
OLIVER W. GNAGE
INVENTORS

BY Gary D. Fields
Robert W. Hampton
ATTORNEYS

METHOD AND APPARATUS FOR CLEANING PHOTOSENSITIVE ELEMENTS

Filed Dec. 14, 1970 5 Sheets-Sheet 4

GARY B. GUSTAFSON
OLIVER W. GNAGE
INVENTORS

BY Gary D. Fields
Robert W. Hampton
ATTORNEYS

METHOD AND APPARATUS FOR CLEANING PHOTOSENSITIVE ELEMENTS

Filed Dec. 14, 1970 5 Sheets-Sheet 5

GARY B. GUSTAFSON
OLIVER W. GNAGE
INVENTORS

BY Gary D. Fields
Robert W. Hampton
ATTORNEYS